United States Patent
Dor et al.

(10) Patent No.: US 9,549,381 B2
(45) Date of Patent: Jan. 17, 2017

(54) CONTROLLING POWER CONSUMPTION IN A POWER AMPLIFIER IN A COMMUNICATION DEVICE

(71) Applicant: QUALCOMM Incorporated, San Diego, CA (US)

(72) Inventors: Eran Dor, Sunnyvale, CA (US); Eyal Hochdorf, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 14/458,073

(22) Filed: Aug. 12, 2014

(65) Prior Publication Data

US 2016/0050636 A1    Feb. 18, 2016

(51) Int. Cl.
| | |
|---|---|
| *H04J 3/16* | (2006.01) |
| *H04W 52/52* | (2009.01) |
| *H04W 52/26* | (2009.01) |
| *H04W 52/28* | (2009.01) |
| *H04W 52/36* | (2009.01) |

(52) U.S. Cl.
CPC ........... *H04W 52/52* (2013.01); *H04W 52/262* (2013.01); *H04W 52/286* (2013.01); *H04W 52/36* (2013.01); *H04W 52/265* (2013.01)

(58) Field of Classification Search
CPC ........... H04B 1/036; H04B 1/04; H04L 47/10; H04W 28/02
See application file for complete search history.

(56) References Cited

U.S. PATENT DOCUMENTS

| | | | |
|---|---|---|---|
| 7,158,489 B1 | 1/2007 | Knuutila et al. | |
| 8,447,344 B2 | 5/2013 | Ratasuk et al. | |
| 8,472,997 B2 | 6/2013 | Zhang et al. | |
| 2003/0096635 A1* | 5/2003 | Uehara | H04L 1/0009 455/561 |

(Continued)

FOREIGN PATENT DOCUMENTS

| | | |
|---|---|---|
| EP | 2270976 A1 | 1/2011 |
| WO | WO-2004068738 A1 | 8/2004 |

(Continued)

OTHER PUBLICATIONS

International Search Report and Written Opinion—PCT/US2015/043877—ISA/EPO—Oct. 9, 2015.

(Continued)

*Primary Examiner* — Kevin C Harper
(74) *Attorney, Agent, or Firm* — Paradice and Li LLP (57) ABSTRACT

A method and apparatus are disclosed for controlling the power consumption of a power amplifier included in a communication device. For at least some embodiments, the power consumption may be controlled by determining an order for the data packets to be transmitted, selecting a coding scheme used to encode the data packets, and/or determining an output power level of the power amplifier. The data packet transmission order, the coding scheme, and/or the output power level may be determined, at least in part, by the temperature of the power amplifier, a quality of service associated with the data packets, a data packet length, and/or a link budget. Adjustments to the data packet transmission order, the coding scheme, and/or the output power level may be made dynamically for each data packet.

16 Claims, 5 Drawing Sheets

(56) References Cited

U.S. PATENT DOCUMENTS

| | | | |
|---|---|---|---|
| 2005/0027840 A1* | 2/2005 | Theobold | H04W 28/00 709/223 |
| 2005/0058151 A1* | 3/2005 | Yeh | H04W 52/46 370/445 |
| 2007/0097936 A1* | 5/2007 | Lee | H04W 74/02 370/338 |
| 2007/0099577 A1* | 5/2007 | Lee | H04L 1/0026 455/69 |
| 2008/0025341 A1* | 1/2008 | Rao | H04W 72/048 370/468 |
| 2008/0176595 A1* | 7/2008 | Karaoguz | H04W 28/18 455/552.1 |
| 2008/0194215 A1 | 8/2008 | Bolanos | |
| 2009/0290625 A1* | 11/2009 | Riddle | G06F 1/206 375/222 |
| 2010/0327968 A1 | 12/2010 | Gueemes et al. | |
| 2011/0317639 A1* | 12/2011 | Lee | H04L 1/0015 370/329 |
| 2012/0075992 A1 | 3/2012 | Shahidi et al. | |
| 2014/0269281 A1* | 9/2014 | Hussain | H04L 47/2433 370/230 |
| 2014/0328184 A1* | 11/2014 | Aminaka | H04L 5/0032 370/237 |
| 2015/0189788 A1* | 7/2015 | Champagne | H05K 7/20 455/127.1 |

FOREIGN PATENT DOCUMENTS

| | | |
|---|---|---|
| WO | WO-2007139588 A1 | 12/2007 |
| WO | WO-2011019440 A1 | 2/2011 |

OTHER PUBLICATIONS

Han K., et al., "Power Amplifier Characteristic-Aware Energy-Efficient Transmission Strategy," Lecture Notes in Computer Science, 2007, vol. 4479, pp. 37-48.

* cited by examiner

CONTROLLING POWER CONSUMPTION IN A POWER AMPLIFIER IN A COMMUNICATION DEVICE

TECHNICAL FIELD

The present embodiments relate generally to communication devices, and specifically to controlling power consumption in a power amplifier in a communication device.

BACKGROUND OF RELATED ART

A communication device may transmit and receive data packets with other communication devices through a communication medium. The communication medium may be a wired medium using, for example, coaxial or twisted pair wires where data packets are transmitted (e.g., driven) over the wires through line drivers. Another communication medium may be a wireless medium where the data packets are transmitted through the air via radio frequency (RF) power amplifiers. The term "power amplifier" may be used to refer to both line drivers and RF power amplifiers. Relatively large output power levels (compared to available output power levels) at the power amplifier may be used to transmit the data packets and increase the communication range between the communication devices. Large output power levels may also reduce transmission errors through the communication medium.

However, relatively large output power levels may increase power consumption and may reduce battery life of the communication device. Relatively large output power levels may also increase heat generated within the communication device. In some cases, the generated heat may be excessive and may cause portions of the communication device to reach a thermal limit. In turn, transmissions from the communication device may be temporarily halted (e.g., throttled) to allow the temperature of the communication device to decrease to an acceptable level. Throttling the transmissions may reduce overall data throughput and increase latency of the transmitted data packets.

Output power levels of the power amplifiers may be fixed to prevent the power amplifier from reaching the thermal limit. However, the fixed output power level is typically less than a maximum available level. Thus, the fixed output power level may reduce the communication range between communication devices and may increase error rates associated with the transmitted data.

Thus, there is a need to improve control of the power amplifier to increase performance of the communication device and reduce power consumption.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A device and method of transmitting data via a wireless communication device are disclosed. In accordance with the present embodiments, a plurality of data packets may be stored in a buffer at the wireless communication device. A temperature of a power amplifier and a characteristic of each of the data packets may be determined. An output power level of the power amplifier may be determined based, at least in part, on the temperature of the power amplifier and the characteristics. A data packet may be selected from the buffer and transmitted.

For some embodiments, the wireless communication device may include a buffer to store a plurality of data packets and a processor to: determine a temperature of a power amplifier; determine a characteristic of each the data packets; select a data packet from the buffer; and determine an output power level of the power amplifier based, at least in part, on the temperature of the power amplifier and the characteristics associated with the plurality of data packets.

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

The present embodiments are described below in the context of Wi-Fi enabled devices for simplicity only. It is to be understood that the present embodiments are equally applicable for devices using signals of other various wireless standards or protocols. As used herein, the terms "wireless local area network (WLAN)" and "Wi-Fi" may include communications governed by the IEEE 802.11 standards, BLUETOOTH®, HiperLAN (a set of wireless standards, comparable to the IEEE 802.11 standards, used primarily in Europe), and other technologies used in wireless communications.

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

Figure 1:
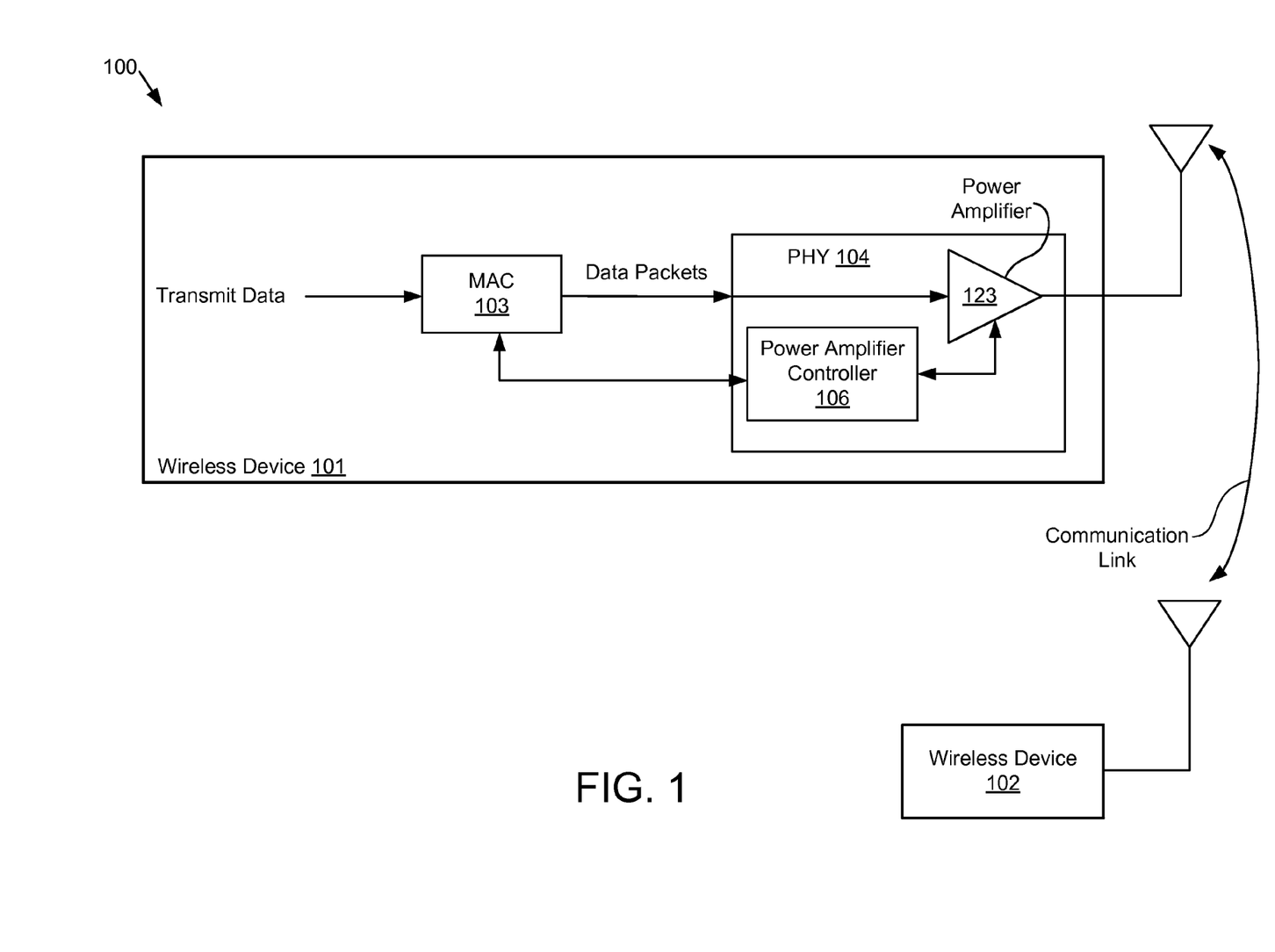
FIG. 1 depicts an example communication system within which the present embodiments may be implemented.

FIG. 1 depicts an example communication system 100 within which the present embodiments may be implemented. As shown, the communication system 100 includes wireless devices 101 and 102. In other embodiments, more than two wireless devices may be included in the communication system 100. The wireless devices 101 and 102 may be Wi-Fi devices and may transmit and receive data packets to each other through a communication link established within the communication medium. The wireless devices 101 and 102 may be any suitable wireless communication devices such as, but not limited to, a cell phone, desktop computer, laptop computer, tablet computer, wireless access point, or the like.

The wireless device 101 may include a media access control (MAC) layer 103 and a physical (PHY) layer 104. The MAC layer 103 may receive data signals from other modules, programs or applications, not shown for simplicity. For example, the MAC layer 103 may enable a plurality of programs and/or applications to access the communication medium through the PHY layer 104. The MAC layer 103 may generate data packets based on data (e.g., provided by upper layers and/or processing resources, not shown for simplicity, in the wireless device 101) and may provide the data packets to the PHY layer 104. The PHY layer 104 may receive, buffer, and process the data packets for transmission onto the communication link by a power amplifier (PA) 123.

The PHY layer 104 may include a PA controller 106 to control operations of the PA 123, and may also control other elements within the PHY layer 104 such as buffers and modulators (not shown for simplicity). In some embodiments, the PA controller 106 may determine operating parameters of the PA 123 and the PHY layer 104. For example, the PA controller 106 may control the output power level of the PA 123 based, at least in part, on the temperature of the PA 123 and/or wireless device 101, data packet characteristics, and/or a link budget associated with the communication link. The operation of the PA controller 106 is described in more detail below in conjunction with FIGS. 3-5. The wireless devices 101 and 102 may be similar and may include similar elements. Thus, in some embodiments, the wireless device 102 may include elements similar to those described with respect to the wireless device 101.

Although described within the context of a wireless device, the present embodiments may also be implemented in a wired communication device. The wired communication device (not shown for simplicity) may be any suitable wired device such as, but not limited to, a desktop computer, a powerline communications (PLC) modem, laptop computer, access point or similar device. The wired communication device may be coupled to a wired medium such as, for example, twisted pair wires, coaxial cables, fiber optic lines, or power lines. The wired communication device may also include a similarly configured MAC layer 103 and PHY layer 104 as described above. The wired communication device may also include a line driver in place of the PA 123.

Figure 2:
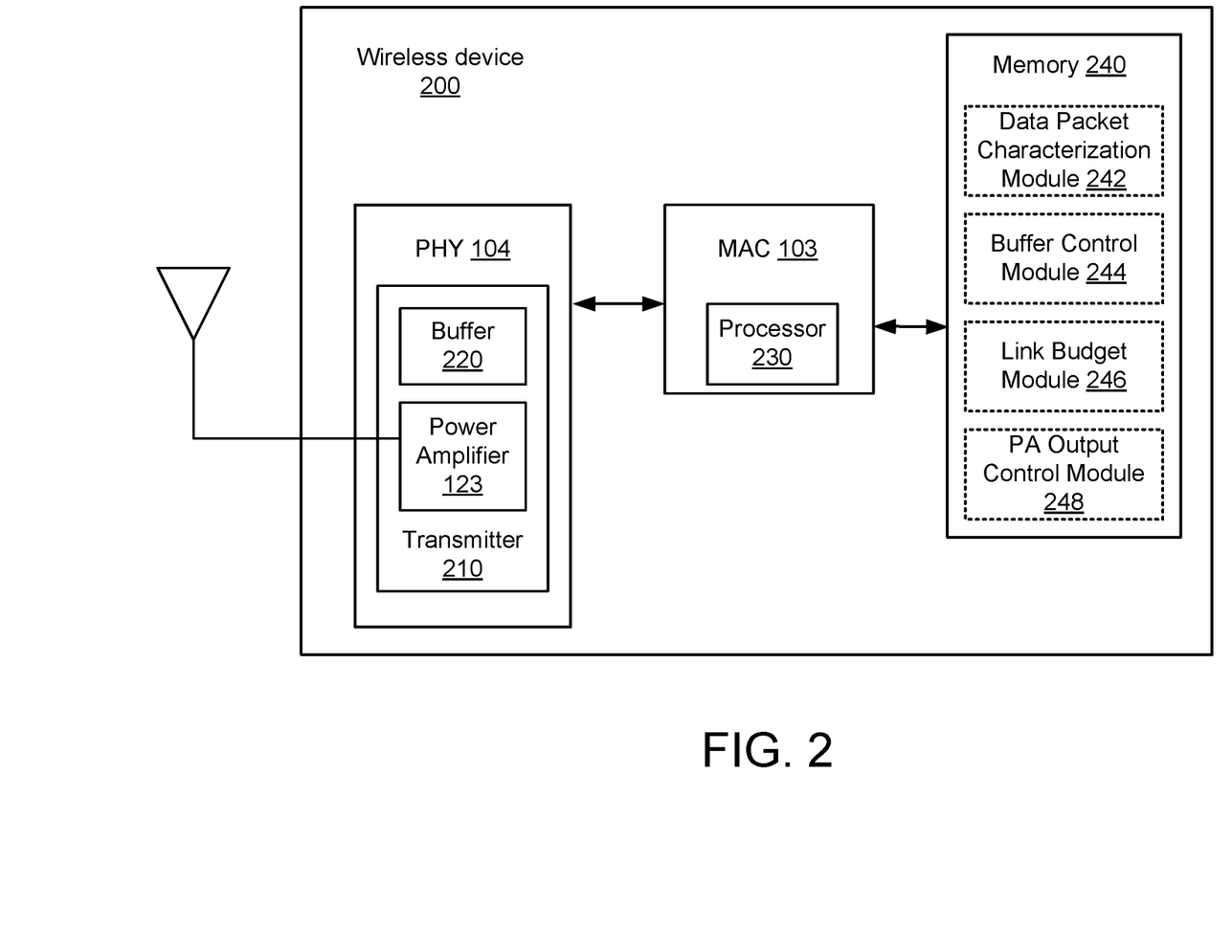
FIG. 2 shows a wireless device that is another embodiment of the wireless device of FIG. 1.

FIG. 2 shows a wireless device 200 that is another embodiment of the wireless device 101 of FIG. 1. The wireless device 200 includes a transmitter 210, a processor 230, and a memory 240. The processor 230 may be associated with the MAC layer 103 of FIG. 1. The transmitter 210 may be associated with the PHY layer 104 of FIG. 1, and is coupled to the processor 230. The transmitter 210 receives data packets from the processor 230 and/or the MAC layer 103 to transmit onto the communications link. The transmitter 210 may encode the data packets according to a selected coding scheme, and may amplify the encoded data packets via the PA 123. The transmitter 210 may include a buffer 220 to store data packets. The processor 230 is coupled to the memory 240.

Further, the memory 240 may also include a non-transitory computer-readable storage medium (e.g., one or more nonvolatile memory elements, such as EPROM, EEPROM, Flash memory, a hard drive, etc.) that may store the following software modules:

a data packet characterization module 242 to determine one or more characteristics associated with the data packets provided to the transmitter 210;

a buffer control module 244 to select data packets for transmission from the buffer 220;

a link budget module 246 to determine a link budget associated with the communication link; and a PA output control module 248 to control the output power of the PA 123 based, at least in part, on characteristics associated with the data packets stored in the buffer 220, the link budget associated with the communication link, the temperature of the PA 123, and/or other suitable parameters.

Each software module includes program instructions that, when executed by the processor 230, may cause the wireless device 200 to perform the corresponding function(s). Thus, the non-transitory computer-readable storage medium of memory 240 may include instructions for performing all or a portion of the operations of FIG. 5. The processor 230 may be any suitable processor capable of executing scripts or instructions of one or more software programs stored in the wireless device 200 (e.g., within the memory 240).

Processor 230 may execute the data packet characterization module 242 to determine one or more characteristics associated with the data packets that may be stored in the buffer 220, the MAC layer 103, and/or the memory 240. In some embodiments, the one or more data packet characteristics may include a packet size and/or packet length. For example, some data packets may be only a few bytes (e.g., an acknowledgement data packet), while other data packets may be a part of an ongoing video stream. In some embodiments, the one or more data packet characteristics may include Quality of Service (QoS) characteristics such as relative priority, latency requirements, scheduling information, and the like. For example, a data packet may be a data packet with timing requirements regarding when the data packet is to be transmitted. In another example, a data packet may be a transmission control protocol (TCP) packet or a user datagram protocol (UDP) packet with transmission timing requirements. The one or more data packet characteristics may include data packet periodicity. For example, a data packet may be a portion of a beacon signal that is transmitted periodically.

The processor 230 may execute the buffer control module 244 to select data packets from the buffer 220 for transmission through the PA 123. The buffer control module 244 may track contents of the buffer 220 and select particular data packets for transmission. In some embodiments, the buffer control module 244 may select data packets for transmission in a different order with respect to the order the data packets were received by the buffer 220.

The processor 230 may execute the link budget module 246 to determine a link budget for the communication link. For example, for a particular communication link, the link budget module 246 may determine a link budget describing a range of output power levels for the PA 123 and/or a range of coding schemes that may enable data packets to be successfully transmitted to a receiving wireless device. In some embodiments, the link budget may be based, at least in part, on a received signal strength indicator (RSSI) of the receiving wireless device.

The processor 230 may execute the PA output control module 248 to select a buffer including a data packet through the buffer control module 244, and may determine a coding scheme for the data packet. The PA output control module 248 may determine the output power level of the PA 123 based, at least in part, on the one or more of the characteristics of the data packet, the temperature of the PA 123, and/or the link budget associated with the communication link with the receiving wireless device.

Thus, in some embodiments, the PA output control module 248 may determine the output power level of the PA 123 for data packets to be transmitted. In some embodiments, the output power level may vary from data packet to data packet and may be dynamically adjusted based on current operating conditions of the wireless device 200, including the temperature of the PA 123. Operations of the data packet characterization module 242, the buffer control module 244, the link budget module 246, and the PA output control module 248 are described below in conjunction with FIGS. 3-5.

Figure 3:
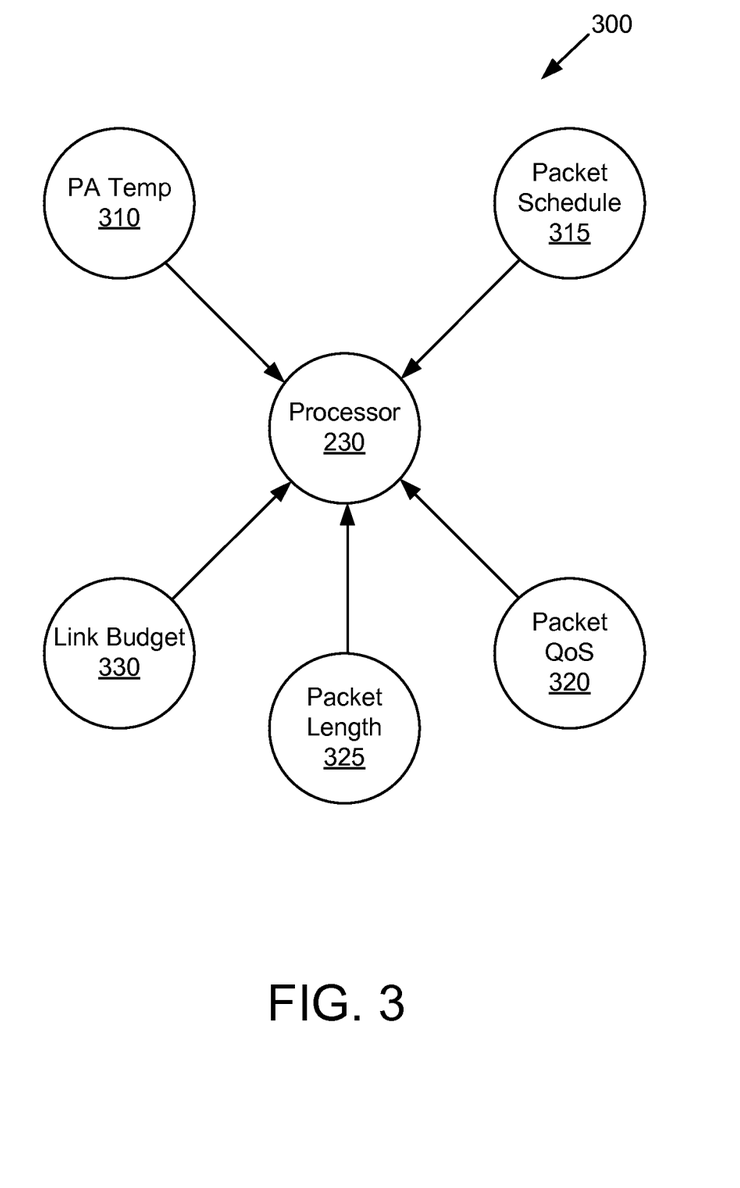
FIG. 3 is a diagram depicting a number of operational parameters that may be provided to the processor and/or used by the processor of the device of FIG. 2 to transmit data packets and control the power consumption of the power amplifier, in accordance with some embodiments.

FIG. 3 is a diagram 300 depicting a number of operational parameters that may be provided to or determined by the processor 230 and/or used by the processor 230 to transmit data packets and control the power consumption of the PA 123, in accordance with some embodiments. For the example embodiment of FIG. 3, the processor 230 may receive PA Temp 310 indicating the temperature of the PA 123, information 315 indicating a scheduling (e.g., timing) characteristic associated with the data packets, information 320 indicating one or more QoS characteristics associated with the data packets, information 325 indicating the length of the data packets, and/or information 330 regarding the link budget associated with the communication link. For some embodiments, the processor 230 may consider any number (e.g., and thus any combination) of operational parameters 310, 315, 320, 325, and 330 when transmitting data packets through the PA 123. While FIG. 3 illustrates the processor 230 receiving all operational parameters 310, 315, 320, 325, and 330, it should be understood that other combinations of information may be received such as, for example, any subset of operational parameters 310, 315, 320, 325, and 330 or parameters not illustrated in FIG. 3.

In some embodiments, the data packets may include a QoS index indicating a relative QoS associated with the data packet. For example, the QoS index may describe a transmission priority of the data packet compared to other data packets. The transmission priority may indicate a relative priority of the data packet. Higher priority data packets such as data packets for beacons or acknowledgements may be assigned a higher QoS index than lower priority data packets such as "best effort" or "background" data packets. Data packets associated with some gaming applications may also be assigned a higher QoS index so that game related data packets may be transmitted before other data packets. In another example, the QoS index may indicate a periodic characteristic of a data packet. The data packet for a periodic beacon may be assigned a higher QoS index compared to a data packet for a non-periodic data packet. In another example, the QoS index may indicate a relative latency associated with the data packet. A data packet with a low latency (e.g., a data packet that may be associated with a short response time) may be assigned a higher QoS index compared to data packets that may be associated with a long response time. In some embodiments, the QoS index may aggregate several QoS characteristics into a single index number. For example, the QoS index may be a weighted average of priority, periodicity, and/or latency. In some embodiments, some or all of the QoS characteristics described above may be included in the QoS index. In other embodiments, other QoS characteristics not described herein may be included in the QoS index. The QoS index may be determined by the MAC layer 103 or other software, hardware or firmware included in the wireless device 101. The QoS index may also be stored in the buffer 220.

Figure 4:
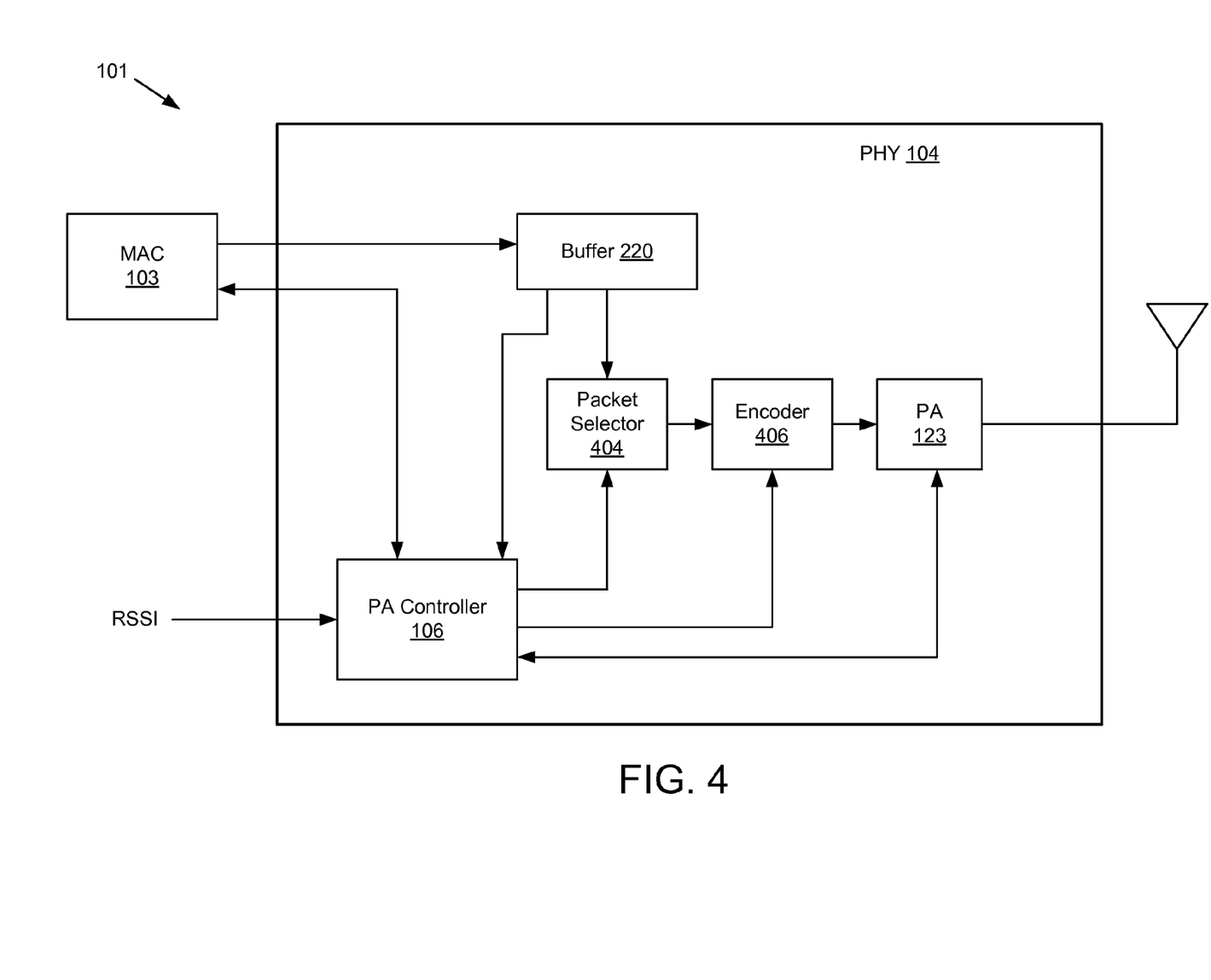
FIG. 4 shows a portion of a wireless device in accordance with some embodiments.

FIG. 4 shows a portion of the wireless device 101 in accordance with some embodiments. As shown, the wireless device 101 includes the MAC layer 103 coupled to the PHY layer 104. The PHY layer 104 includes the PA 123, the PA controller 106, the buffer 220, a packet selector 404, and an encoder 406. The MAC layer 103 is coupled to the buffer 220 and to the PA controller 106. The buffer 220 may receive and/or store data packets received from the MAC layer 103.

The packet selector 404 is coupled to the buffer 220, the PA controller 106, and the encoder 406. The packet selector 404 may select a data packet from the buffer 220 and provide the data packet to the encoder 406. The encoder 406 may encode the data packet for transmission through the communication link. In some embodiments, the encoder 406 may encode the data packet in accordance with a coding scheme, such as a modulation and coding scheme (MCS) described by the IEEE 802.11 standards. Some coding schemes may encode more bits per symbol than other coding schemes, and may therefore have a higher coding rate than the other coding schemes. Conversely, some coding schemes may encode fewer bits per symbol compared to other coding schemes, and may therefore have a lower coding rate than the other coding schemes. The PA 123 may be coupled to the encoder 406, and may receive the encoded data packet from the encoder 406. The PA 123 may transmit the encoded data packet at an output power level.

The PA controller 106 is coupled to and may control the buffer 220, the packet selector 404, the encoder 406, and/or the PA 123. The PA controller 106 may determine the output power level of the PA 123 based, at least in part, on the one or more data packet characteristics, the temperature of the PA 123, and/or the link budget. The one or more data packet characteristics may include data packet length, data packet scheduling information, and data packet QoS information. The PA controller 106 may determine data packet length information from the buffer 220 and/or from the MAC layer 103. The MAC layer 103 may provide data packet scheduling information such as, for example, information indicating whether the data packet is associated with a periodic signal. Periodic signals may be time-sensitive signals, such as a beacon signal. In some embodiments, the data packet QoS information may be determined by the QoS index associated with the data packet stored in the buffer 220. In other embodiments, the data packet QoS information may be provided by the MAC layer 103. The link budget may be based on RSSI information received by the PA controller 106. As described above, the link budget may determine a range of output power levels for the PA 123.

The PA controller 106 may determine the coding scheme used by the encoder 406 based, at least in part, on the temperature of the PA 123, the one or more data packet characteristics, the data packet QoS information, and/or the link budget information. The link budget may determine a range of coding schemes that the encoder 406 may use. The PA controller 106 may also control the packet selector 404 to select data packets from the buffer 220 based, at least in part, on the data packet QoS information, the one or more data packet characteristics, and/or the temperature of the PA 123.

In some embodiments, the determination of the output power level of the PA 123, the determination of the coding scheme used by the encoder 406, and the selection of the data packet by the packet selector 404 may be accomplished separately or in parallel by the PA controller 106. For example, the PA controller 106 may concurrently determine a link budget, an output power level and/or a coding scheme that may satisfy the link budget while operating the PA 123 within a predefined temperature range. In another example, the PA controller 106 may determine the link budget, the output power level, and/or the coding scheme separately.

In some embodiments, the PA controller 106 may select relatively shorter data packets (compared to other data packets) from the buffer 220 to transmit through the PA 123. Shorter data packets may be transmitted more quickly than longer data packets and may allow cooling periods for the PA 123. In some embodiments, a brief quiet (non-transmitting) period may be scheduled by the PA controller 106 between data packet transmissions. The quiet periods may allow the temperature of the PA 123 to decrease. In some embodiments, the scheduling of the quiet periods may fulfil latency requirements of the transmitted data packets that may be indicated by the QoS index. In some embodiments, shorter data packets may be transmitted at a higher output power level because the PA 123 operates for a shorter duration and, therefore, may generate less heat over a time period.

In some embodiments, the PA controller 106 may select relatively longer data packets from the buffer 220 to transmit through the PA 123. For example, when the temperature of the PA 123 is less than a threshold, the PA controller 106 may select longer data packets to transmit since a cooler PA 123 may sustain a temperature rise associated with a longer data transmission (e.g., as compared to a hotter PA 123). Thus, the PA controller 106 may control the temperature of the PA 123 by selecting longer or shorter data packets to transmit depending on various operational parameters described herein.

In some embodiments, the PA controller 106 may select a higher coding scheme (when allowed by the link budget) to transmit the data packets more quickly. By doing so, the PA controller 106 may schedule a quiet period between data packet transmissions to allow the temperature of the PA 123 to decrease.

In some embodiments, the PA controller 106 may select data packets having a relatively higher priority to transmit through the PA 123. In some cases, the data packets may be selected in a different order than they were stored in the buffer 220. Selecting higher priority data packets (e.g., rather than relatively lower priority data packets) may allow the data packets to be transmitted in accordance with the data packet QoS information.

In some embodiments, the PA controller 106 may adjust the output power level within the range determined by the link budget. For example, the PA controller 106 may increase the output power level to extend a communication range between a transmitting communication device and a receiving communication device. Alternatively, the PA controller 106 may decrease the output power level to reduce power consumption and/or reduce the temperature of the PA 123. In some embodiments, the PA controller 106 may adjust the coding scheme used to encode the data packets within the range determined by the link budget. For example, the PA controller 106 may select a higher coding scheme to shorten the duration of the data transmission or the PA controller 106 may select a lower coding scheme to increase reliability of the data transmission.

Figure 5:
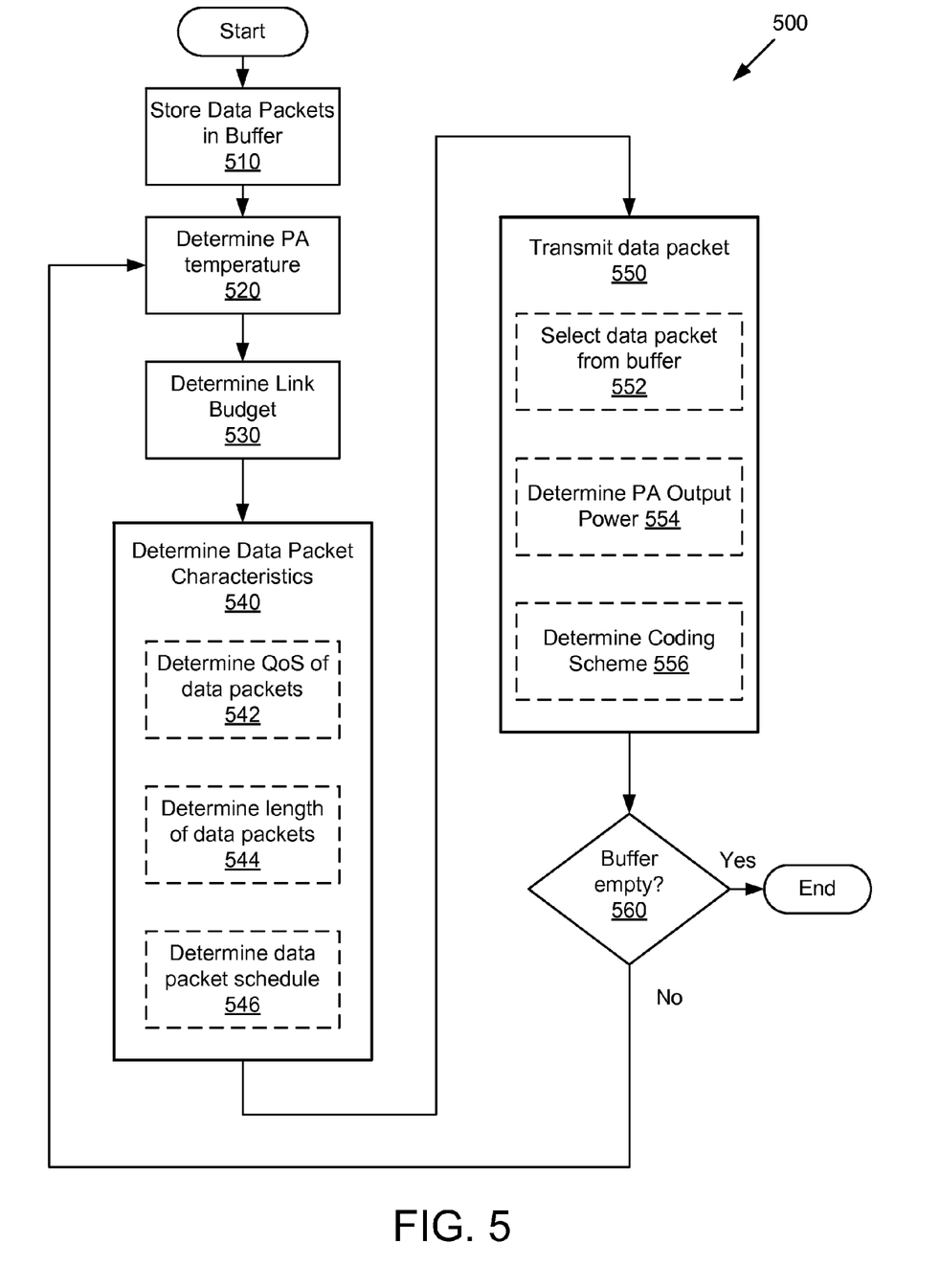
FIG. 5 shows an illustrative flow chart depicting an example operation for transmitting data packets from a first wireless device to a second wireless device, in accordance with some embodiments.

FIG. 5 shows an illustrative flow chart depicting an example operation 500 for transmitting data packets from a first wireless device to a second wireless device, in accordance with some embodiments. Some embodiments may perform the operations described herein with additional operations, fewer operations, operations in a different order, operations in parallel, and/or some operations differently. Referring also to FIG. 4, data packets may be stored in the buffer 220 (510). In some embodiments, the data packets may be provided by the MAC layer 103. The data packets may be of varying lengths and may include a QoS index describing a relative priority of the data packets. Next, the PA controller 106 determines the temperature of the PA 123 (520). In some embodiments, the PA controller 106 may determine the temperature of the PA 123 through a temperature sensor (not shown for simplicity) included within the PA 123. Next, the PA controller 106 determines the link budget for a communication link between the first and the second wireless devices (530). For example, the PA controller 106 may receive RSSI information from the receiving communication device. The link budget may be based, at least in part, on the RSSI information and may include ranges of output power levels for the PA 123 and/or may include ranges of coding schemes for encoding the data packet.

Next, the PA controller 106 determines the one or more characteristics of the data packets in the buffer 220 (540). For some embodiments, the PA controller 106 may determine data packet characteristics such as, for example, data packet priority, data packet latency, data packet periodicity, and the like. For some embodiments, the PA controller 106 may determine the QoS of the data packets (542). For example, the PA controller 106 may determine the QoS index associated with the data packets. In another example, the PA controller 106 may receive QoS information associated with the data packets from the MAC layer 103. For some embodiments, the PA controller 106 may determine the length of the data packets (544). For example, the PA controller 106 may determine the length of the data packets stored in the buffer 220. In another example, the PA controller 106 may determine the length of the data packets using information received from the MAC layer 103. For some embodiments, the PA controller 106 may determine data packet schedule information (546). Data packet schedule information may include information regarding a time schedule associated with the data packets stored in the buffer 220. For example, the PA controller 106 may receive the data packet schedule information from the MAC layer 103. In another example, the PA controller 106 may determine the data packet schedule information by tracking and characterizing data packets stored in the buffer 220.

Next, the PA 123 transmits a data packet (550). More specifically, in some embodiments, the PA controller 106 may select a data packet from the buffer 220 (552), determine an output power level for the PA 123 (554), and/or determine a coding scheme for the encoder 406 (556). The selected data packet is encoded using the determined coding scheme, and is transmitted by the PA 123 at the determined output power level. The selection of the data packet 552, the determination of the output power level 554, and the determination of the coding scheme 556 may be based, at least in part, on the temperature of the PA 123, the link budget, and/or the one or more data packet characteristics as described above in conjunction with FIGS. 3 and 4.

Next, the PA controller 106 may determine if the buffer 220 is empty (560). If the buffer 220 is empty, then the operation ends. If the buffer 220 is not empty, then the operation proceeds to 520.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of transmitting data via a wireless communication device, the method comprising:
    storing, at the wireless communication device, a plurality of data packets in a buffer;
    determining a temperature of a power amplifier;
    determining a characteristic of each of the data packets;
    selecting a data packet from the buffer based, at least in part, on the temperature of the power amplifier and a Quality of Service (QoS) index based, at least in part, on a weighted average of data packet priority, data packet periodicity, and data packet latency;
    determining an output power level of the power amplifier based, at least in part, on the temperature of the power amplifier and the characteristic; and
    transmitting the selected data packet.

2. The method of claim 1, wherein determining the output power level of the power amplifier is based, at least in part, on a data packet length when the temperature of the power amplifier is greater than a predetermined threshold.

3. The method of claim 1, wherein selecting the data packet further comprises selecting the data packet in an order different from the order that the plurality of data packets are stored in the buffer.

4. The method of claim 1, further comprising:
    determining a coding scheme based, at least in part, on a link budget and the output power level of the power amplifier; and
    encoding the selected data packet using the coding scheme.

5. The method of claim 1, further comprising:
    increasing the output power level of the power amplifier when a length of the selected data packet is less than a predetermined length.

6. The method of claim 1, further comprising:
    decreasing the output power level of the power amplifier when a length of the selected data packet is greater than a predetermined length.

7. The method of claim 1, wherein the characteristic includes the QoS index.

8. The method of claim 1, wherein transmitting the selected data packet further comprises scheduling a quiet period between transmissions based, at least in part, on the QoS index.

9. The method of claim 1, wherein selecting the data packet is based, at least in part, on scheduling information associated with the data packets stored in the buffer.

10. A wireless communication device comprising:
    a physical (PHY) layer comprising:
        a buffer to store a plurality of data packets; and
        a power amplifier coupled to the buffer and configured to transmit the data packets;
    a media access control (MAC) layer coupled to the PHY layer, the MAC layer comprising:
        a processor; and
        a memory, coupled to the MAC layer, storing instructions that, when executed by the processor, cause the wireless communication device to:
            determine a temperature of the power amplifier;
            determine a characteristic of each the data packets;
            select a data packet from the buffer based, at least in part, on the temperature of the power amplifier;
            determine an output power level of the power amplifier based, at least in part, on the temperature of the power amplifier and the characteristic; and
            transmit the selected data packet.

11. The wireless communication device of claim 10, wherein execution of the instructions further causes the wireless communication device to select the data packet in an order different from the order that the plurality of data packets are stored in the buffer.

12. The wireless communication device of claim 10, wherein execution of the instructions further causes the wireless communication device to:
    determine a coding scheme based, at least in part, on a link budget and the output power level of the power amplifier; and
    encode the selected data packet using the coding scheme.

13. The wireless communication device of claim 10, wherein execution of the instructions further causes the wireless communication device to select the data packet based, at least in part, on a Quality of Service (QoS) index associated with the selected data packet, wherein the QoS index is based, at least in part, on a weighted average of data packet priority, data packet periodicity, and data packet latency.

14. A non-transitory computer-readable medium storing instructions that, when executed by a processor of a wireless communication device, causes the wireless communication device to:
    store a plurality of data packets in a buffer;
    determine a temperature of a power amplifier;
    determine a characteristic of each of the data packets;
    select a data packet from the buffer based, at least in part, on the temperature of the power amplifier and a Quality of Service (QoS) index based, at least in part, on a weighted average of data packet priority, data packet periodicity, and data packet latency;
    determine an output power level of the power amplifier based, at least in part, on the temperature of the power amplifier and the characteristic; and
    transmit the selected data packet.

15. The non-transitory computer-readable medium of claim 14, wherein execution of the instructions further causes the wireless communication device to select the data packet further comprise instructions to select the data packet in an order different from the order that the plurality of data packets are stored in the buffer.

16. The non-transitory computer-readable medium of claim 14, execution of the instructions further causes the wireless communication device to:
    determine a coding scheme, based, at least in part, on a link budget and the output power level of the power amplifier; and
    encode the selected data packet using the coding scheme.

* * * * *